United States Patent
Higashio

Patent Number: 5,900,869
Date of Patent: May 4, 1999

[54] INFORMATION PROCESSOR SYSTEM ALLOWING MULTI-USER EDITING

[75] Inventor: Kimihiko Higashio, Kobe, Japan

[73] Assignee: Minolta Co., Ltd., Osaka, Japan

[21] Appl. No.: 08/974,392

[22] Filed: Nov. 19, 1997

Related U.S. Application Data

[63] Continuation of application No. 08/498,411, Jul. 5, 1995, abandoned.

[30] Foreign Application Priority Data

Jul. 6, 1994 [JP] Japan ..................... 6-154378

[51] Int. Cl.$^6$ ............... G06F 3/00; G06F 3/033
[52] U.S. Cl. ............ 345/332; 345/145; 345/331; 345/339
[58] Field of Search ................. 345/332, 331, 345/329, 971, 333, 334, 339, 163, 157, 145

[56] References Cited

U.S. PATENT DOCUMENTS

| | | | |
|---|---|---|---|
| 4,026,555 | 5/1977 | Kirschner et al. | 345/168 X |
| 5,107,443 | 4/1992 | Smith et al. | 345/331 |
| 5,245,553 | 9/1993 | Tanenbaum | 345/329 X |
| 5,319,747 | 6/1994 | Gerrissen et al. | 345/329 X |
| 5,337,407 | 8/1994 | Bates et al. | 345/331 |
| 5,442,788 | 8/1995 | Bier | 345/332 X |
| 5,515,491 | 5/1996 | Bates et al. | 345/331 |
| 5,548,304 | 8/1996 | Yoshino et al. | 345/145 |
| 5,586,243 | 12/1996 | Barber et al. | 345/145 X |

OTHER PUBLICATIONS

*Nihon Keizai Shinbun*; Part 2, p. 1, Oct. 1, 1993.

*Primary Examiner*—Raymond J. Bayerl
*Attorney, Agent, or Firm*—Burns, Doane, Swecker & Mathis, LLP

[57] ABSTRACT

An information processor system includes a control unit for controlling the entire system mainly formed of a CPU, a display for displaying image data to be edited, a keyboard for entering various inputs, a plurality of mice for applying simple instructions of editing work instead of input from the keyboard, and a printer for printing out image data displayed on the display onto a sheet of paper. The display has four types of images displayed. A plurality of cursors corresponding to each of the plurality of mice are displayed on the screen.

10 Claims, 10 Drawing Sheets

INFORMATION PROCESSOR SYSTEM ALLOWING MULTI-USER EDITING

This application is a continuation of application Ser. No. 08/498,411, filed Jul. 5, 1995, now abandoned.

BACKGROUND OF THE INVENTION

1. Field of the Invention

The present invention relates to information processor systems, and more particularly, to an information processor system that is controlled by an instruction from an input device such as a mouse.

2. Description of the Background Art

Many conventional computers have an input device such as a mouse attached to allow indication of a simple input in lieu of input via a keyboard.

A conventional computer terminal generally has only one input device which is exclusively used by only one person. More specifically, one computer terminal can be used by just one person that provides instructions for carrying out a task. Although the data can be shared in common, the work associated with manipulating a computer terminal cannot be shared.

In an interactive working environment such as an evaluation of a design displayed on the screen of a display device, the sketch or image created by one person is often to be modified by another person in real time. Co-operative work essentially relates to involvement of one person to the work of another, which is further subject to the involvement of another person. The involvement of many persons with respect to one plan or scheme is often encountered in a general working environment.

In view of the foregoing, input devices have further evolved, and a computer system including a plurality of mice with respect to one display terminal has been proposed. According to this system, a cursor appearing on the display can be sequentially used by multiple people. It is useful in the case where a joint process is carried out by several people, such as the case of discussing designs or illustrations on a display.

The above computer system is disadvantageous in that only the person that has control of the mouse currently connected to the cursor can enter an input or instruction on the display since only one cursor appears on the display in spite of the plurality of connected input devices. The others each with a mouse or a likewise input device must wait until the control of the cursor is transferred to its own mouse or otherwise apply indication orally or by pointing out with a finger, which is the conventional means in order to proceed with the interactive work. The usability thereof was not satisfactory.

SUMMARY OF THE INVENTION

An object of the present invention is to provide an information processor system that allows editing by a plurality of users in an environment where one computer terminal can be sufficiently shared in common.

A processor system according to an aspect of the present invention provides a plurality of pointers corresponding to each of a plurality of input devices on a display unit. Since indication can be entered from each of the plurality of input devices, a plurality of users can commonly share one processor system. Therefore, the operability is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
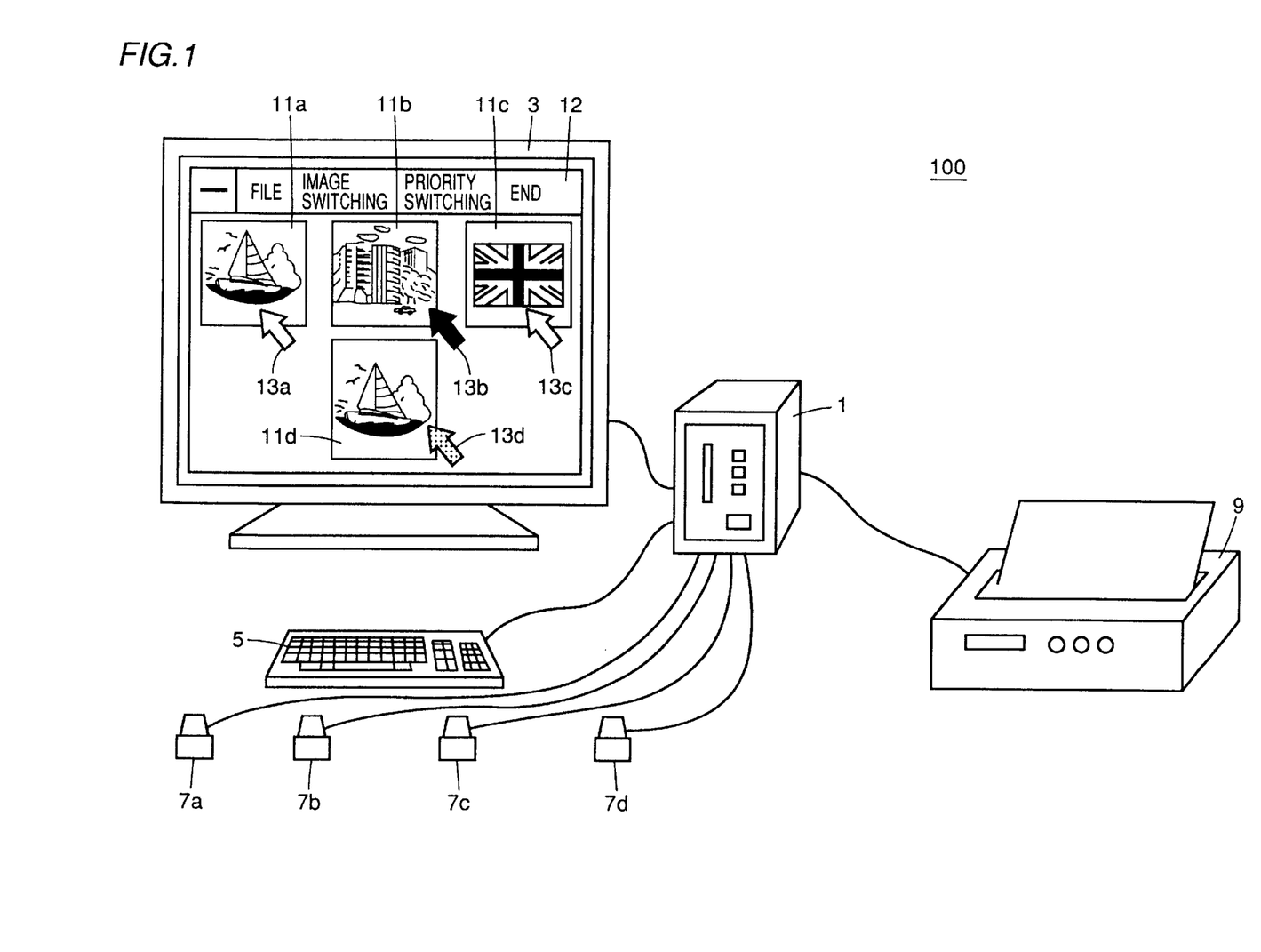
FIG. 1 is a perspective view schematically showing a structure of an information processor system according to an embodiment of the present invention.

Referring to FIG. 1, an information processor system includes a control device 1 for controlling the entirety of the information system on the basis of a CPU, a display unit 3 for displaying image data to be edited, a keyboard 5 for entering various instructions, a plurality of mice 7a–7d for providing simple instructions for the edition job instead of or along with an input via keyboard 5, and a printer 9 for providing image data or the like on display 3 onto a sheet of paper. Four types of images 11a–11d are shown on display 3. Cursors or pointers 13a–13d controlled according to each of mice 7a–7d are also displayed. A menu display 12 is provided at the upper portion of images 11a–11d.

Figure 2:
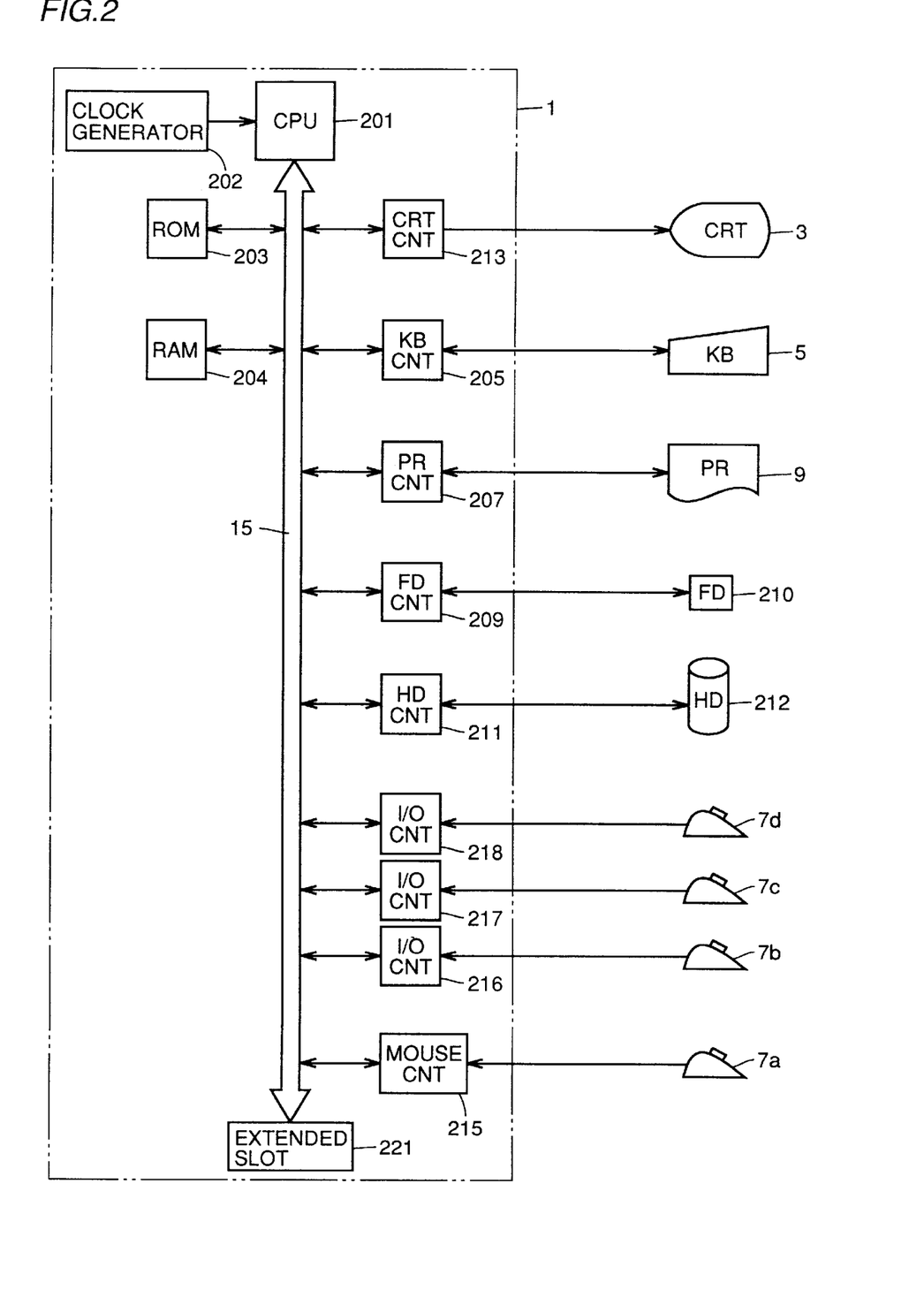
FIG. 2 is a block diagram showing a specific system structure on the basis of a control unit 1 of FIG. 1.

FIG. 2 is a block diagram of the system structure on the basis of control device 1 of FIG. 1.

Referring to FIG. 2, control device 1 is mainly formed of a CPU 201 such as Type i80386 or Type i80486 produced by Intel Corporation. Control device 1 includes an ROM 203 in which a program or the like is stored for controlling each block forming the present system, an RAM 204 for storing data and programs, a keyboard control circuit 205 for transfer-controlling input data from keyboard 5, a printer control circuit 207 for controlling data output towards printer 9, a floppy disc control circuit 209 for controlling a floppy disc 210, a hard disc control circuit 211 for controlling a hard disc 212, a display control circuit 213 for providing text and graphic display on display (CRT) 3, a mouse control circuit 215 for controlling a system mouse 7a, and input/output control circuits 216–218 for controlling input from various devices, which are all connected via a control-data bus 15 connected to CPU 201. Input/output control circuits 216–218 are provided with input/output ports to which extended mice 7b–7d are connected. Data is transferred to CPU 201 via respective extended mice 7b–7d. CPU 201 makes determination whether the device connected to the input/output port is a mice or not. If the device is a mouse, an input signal is processed as data from a mouse.

A clock generator 202 for generating a reference clock required for operating the present system is connected to CPU 201. Furthermore, an extended slot 221 for connecting various extended boards are connected via control•data bus 15. An I/O board may be connected to extended slot 221, and extended mice 7b–7d may be connected to the port thereof. Although a system having only one mouse control circuit is shown in the present embodiment, the system may include a plurality of mouse control circuits. Although each mouse is shown to be connected by a cord in the present embodiment, cordless connection is allowed as a medium of various interface devices (for example, an infrared input/output device). A cordless connection will improve the usability thereof.

The operation of a multi-user edit program according to an embodiment of the present invention will be described hereinafter.

When the present program is activated, an initial screen is displayed. In the initial screen, a menu (12 in FIG. 1) which will be described later and a plurality of mouse cursors are displayed. The mouse cursor having the first priority (for example, 13b in FIG. 1), the mouse cursor having the second priority (for example, 13d in FIG. 1), and the mouse with no priority (for example, 13a, 13c in FIG. 1) are displayed in red, yellow, and white, respectively. In the present program, the following four main menus are displayed.

1. File

Figure 10:
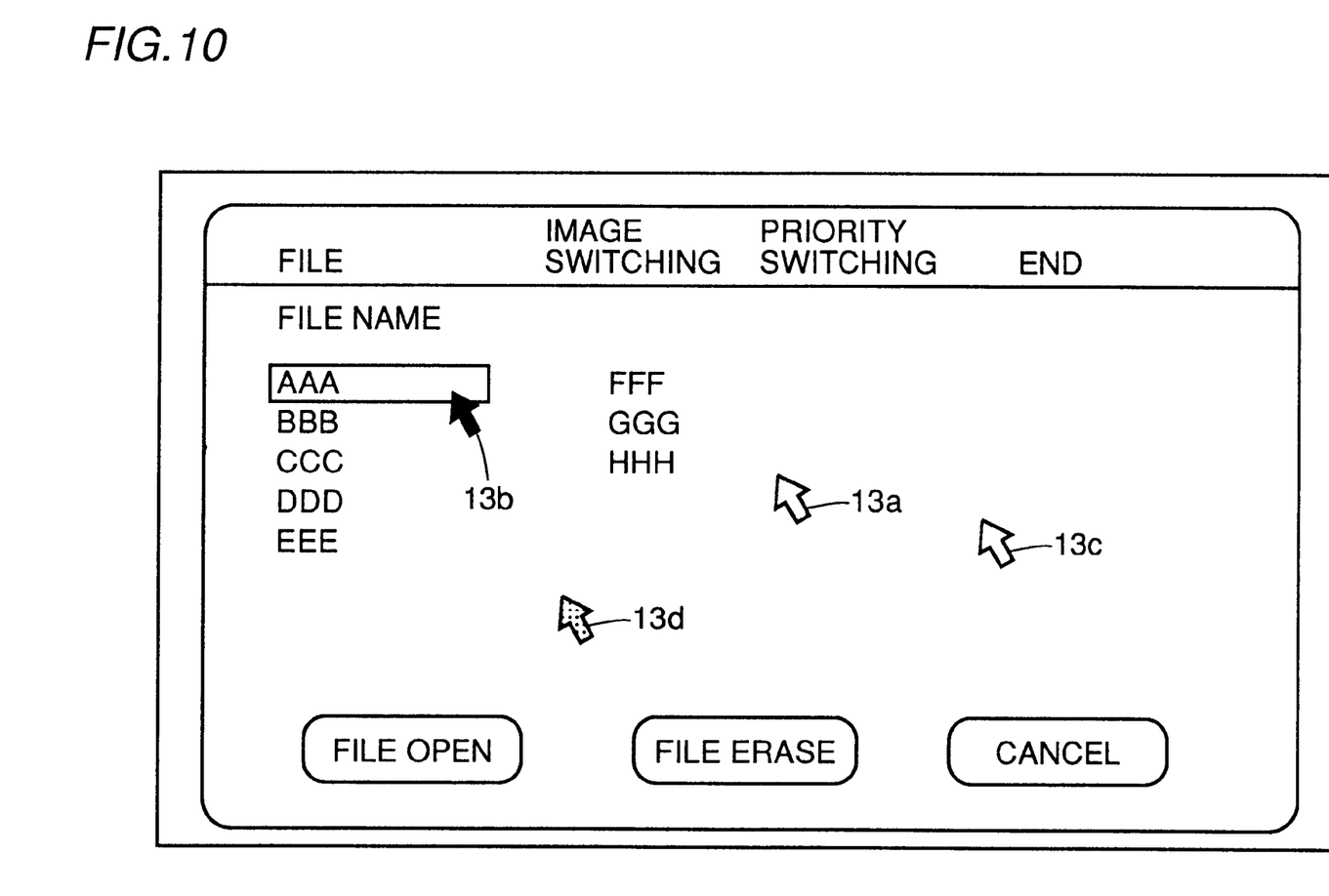
FIG. 10 shows an example of a file select screen.

By clicking command "file" displayed at the upper portion of the image data display screen of FIG. 1 with a mouse, the screen switches to a file select screen shown in FIG. 10. The names of all the image data files that can currently be accessed are displayed on the screen. The sub menu commands of "file open", "file erase" and "cancel" are displayed at the bottom of the screen. An operator selects an arbitrary image data with a mouse (in FIG. 10, image data AAA is selected), and the sub menu command of "file open" or "file erase" is clicked with a mouse. The selected file is opened or erased. The screen returns to the image data display screen of FIG. 1 when the command of "cancel" is clicked. This file operation is carried out only by the mouse having the first priority (input by mouse 7b corresponding to cursor 13b in FIG. 1).

2. Image Switching

An image is selected with a mouse from the state shown in FIG. 1. Here, the selected image is indicated due to particular measures such as the frame of the selected image being shown in a bold line. Then, by clicking command "image switching" displayed at the upper portion of the image data display screen of FIG. 1 with a mouse, the selected image is displayed in an enlarged manner filling the whole screen. The normal display state of FIG. 1 can be recovered by clicking command "image switching" while an enlarged display is shown. This image switching process is carried out only from an input of a mouse having the first priority and the second priority (input by mice 7b and 7d corresponding to cursors 13b and 13d, respectively, in FIG. 1).

Processes other than the above-described file process and image switching process, for example indication of an image using a cursor on the display screen, is carried out by a mouse that does not have any priority.

3. Priority Switching

When a priority switching menu is selected, the priority of the mouse with the current priority is switched to that of a mouse of one lower level. This process is carried out only by input of a mouse having the first or the second priority.

4. End

When an end menu is selected, the present program is terminated.

The operable range of a mouse is not equivalent for all the mice. The operable range is differentiated for the mice so that critical operation such as file operation can be operated only by the mouse (or input device) having a high priority. Such measures are taken to avoid the danger of data damage or the like caused by careless file operation.

Figure 3:
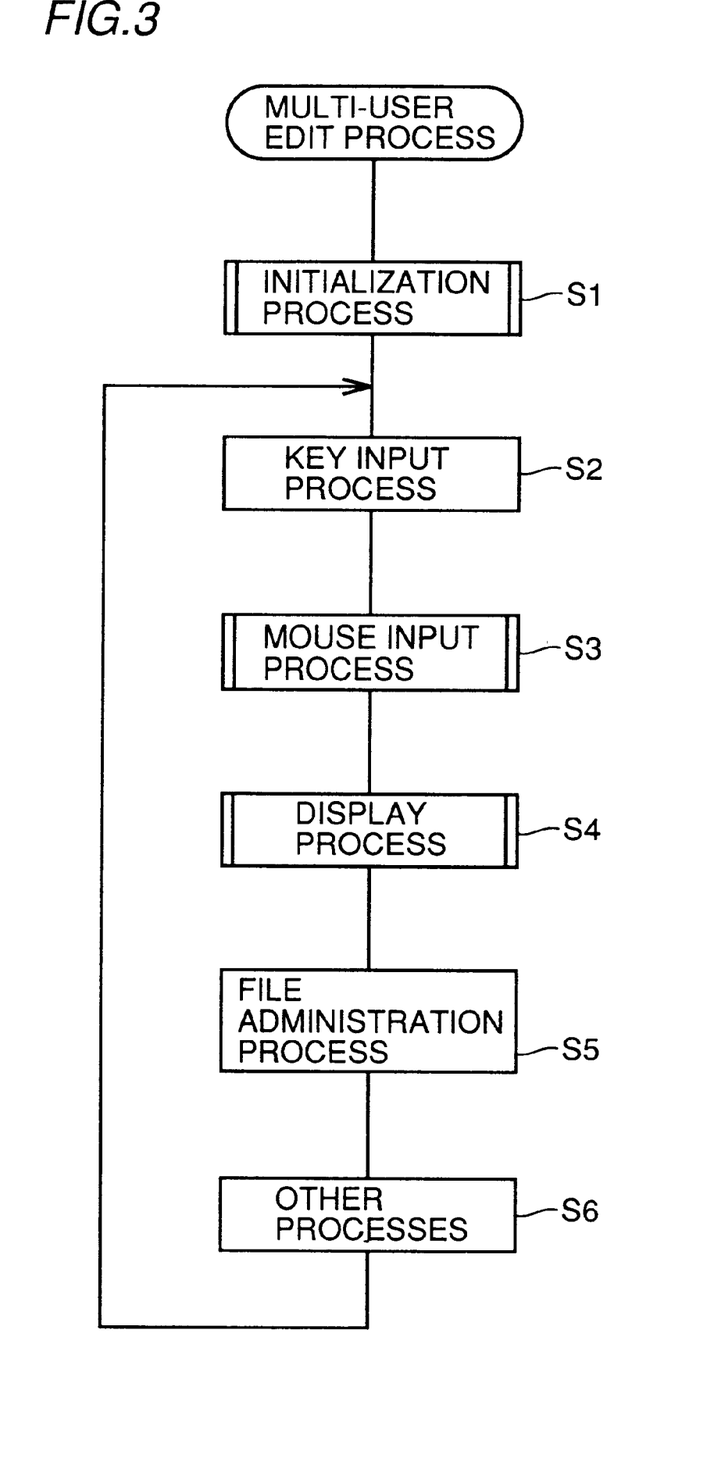
FIG. 3 is a flow chart showing the main routine of a multi-user edit process program in the information processor system of FIGS. 1 and 2.

FIG. 3 is a flow chart showing the main routine of the multi-user edit process program in the information processor system of FIGS. 1 and 2.

When the present program is activated, an initialization process according to an initialization screen display is carried out at step S1. At step S2, a key input process according to input from keyboard 5 is carried out. At step S3, a mouse input process is carried out according to input from each of mice 7a–7d. At step S4, a process related to display of display unit 3 is carried out. At step S5, a file administration process is carried out that controls the memory storing files of various discs. Then at step S6, other processes are sequentially carried out. When all the processes are completed, the control returns to step S2 to repeat the subsequent process.

The key input process (S2), the file administration process (S5) and the other processes (S6) shown in the figure are basically similar to those of a conventional edit system. There are not directly related to the concept of the invention of the present application, and are not otherwise described herein.

Figure 4:
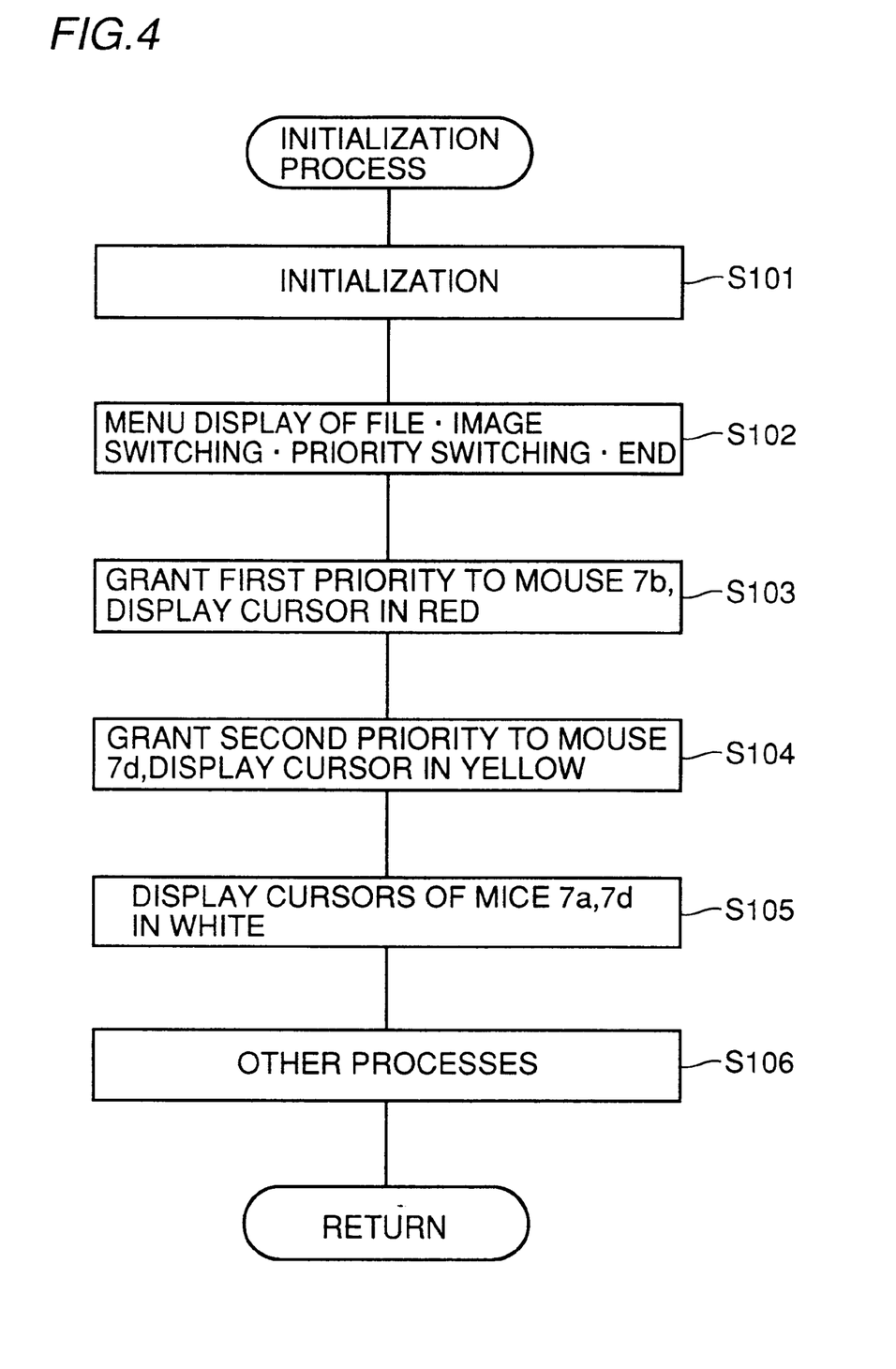
FIG. 4 is a flow chart of the initialization process routine of FIG. 3.

FIG. 4 is a flow chart showing the contents of the initialization process routine of FIG. 3.

At step S101, initialization such as setting a flag required for various processes that will be described afterwards is carried out.

Then, the menu of "File, Screen Switching, Priority Switching, and End" is displayed to obtain the initialization screen. At step S103, mouse 7b is assigned the first priority which has the maximum operable range, and the corresponding cursor is displayed in red. At step S104, mouse 7d is assigned the second priority which has the next maximum operable range with respect to mouse 7b, and the corresponding cursor is displayed in yellow. At step S105, and the corresponding cursors of mice 7a and 7b are displayed in white to notify the user that no particular priority is assigned thereto. Then, the other processes are carried out at S106. Thus, the initialization process is completed.

Figure 5:
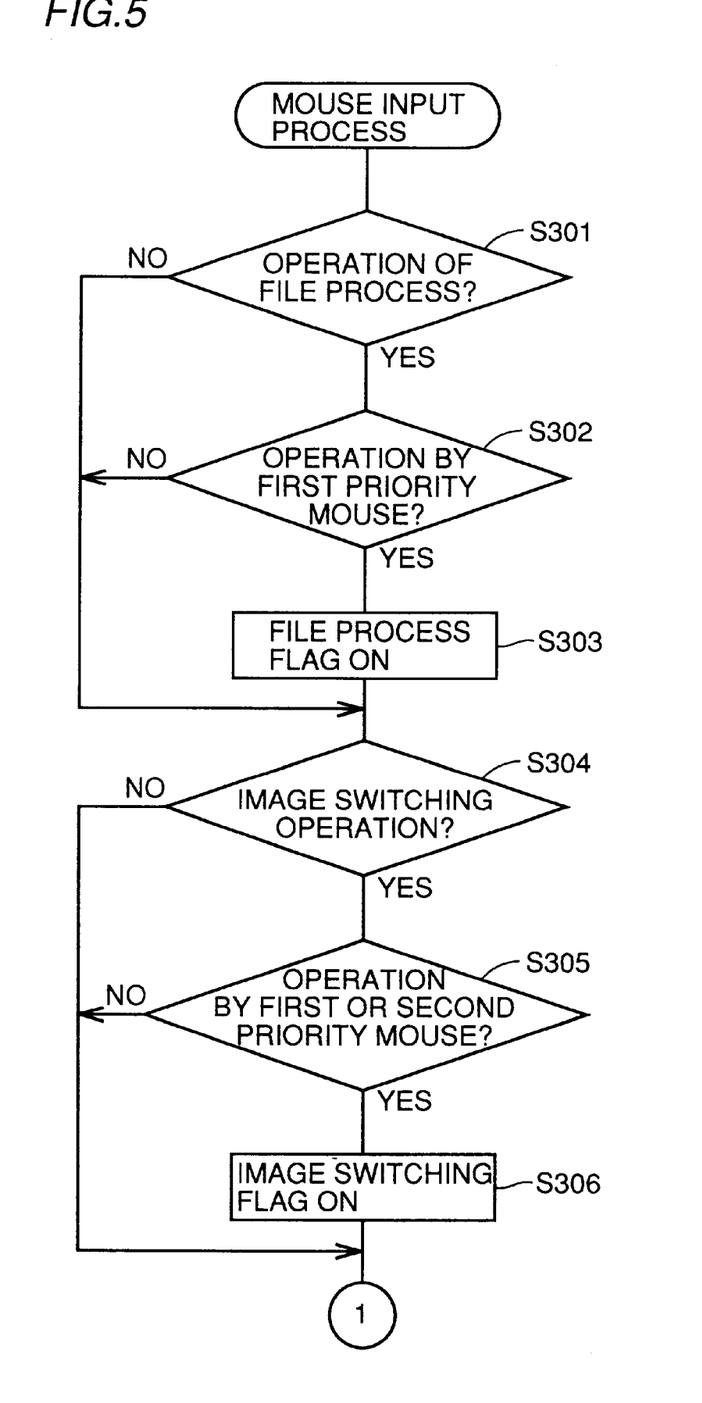
FIG. 5 is a flow chart partially showing the mouse input process routine of FIG. 1.
Figure 6:
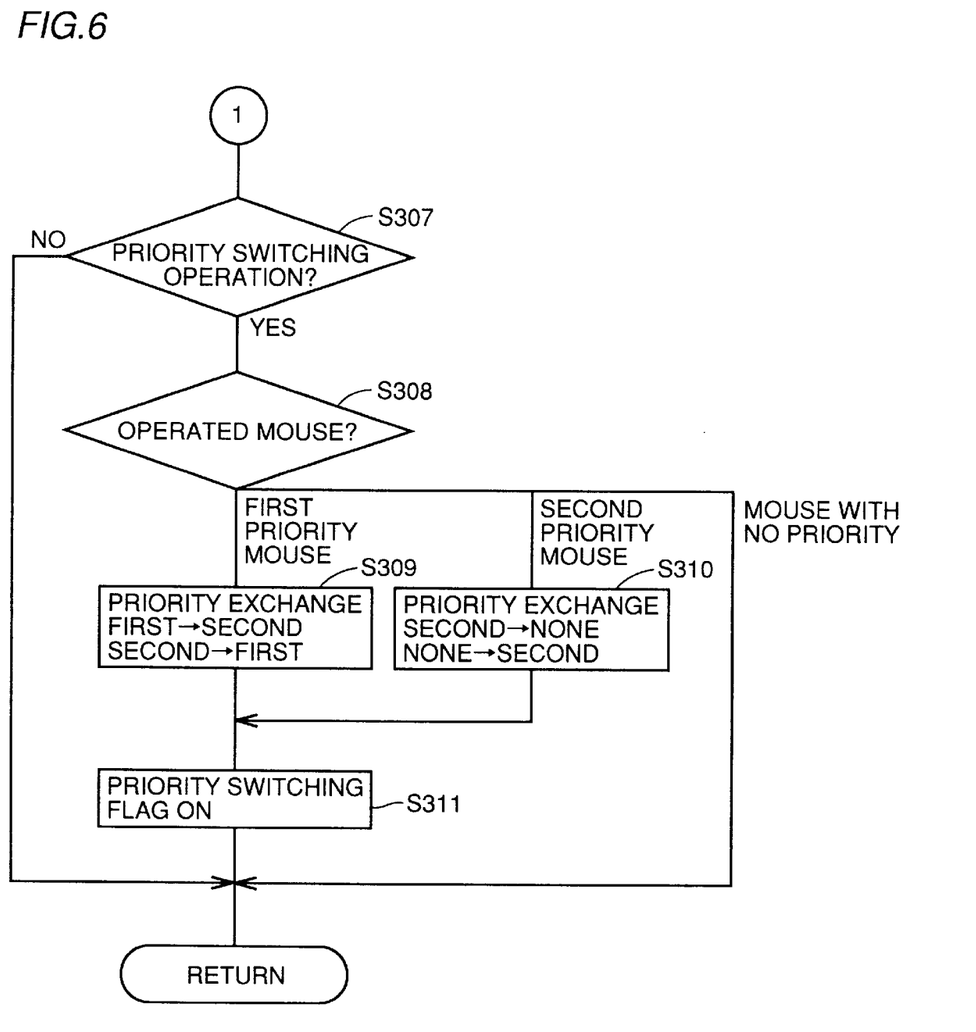
FIG. 6 is a flow chart partially showing another mouse input process routine of FIG. 3.

FIGS. 5 and 6 are flow charts showing the contents of the mouse input process routine of FIG. 3.

Upon entering the mouse input process, determination is made whether the input concerns manipulation of the file at step S301. When a file process operation is specified, determination is made at step S302 whether that operation is based on the mouse having the first priority. A file process flag is turned on (S303) only when the operation is based on the mouse having the first priority.

The process of step S303 is skipped when the input is not a file process manipulation or when the operation is based on a mouse other than that having the first priority.

At step S304, determination is made whether the input is an image switching operation or not. When YES, determination is made whether the operation is based on a mouse having the first or second priority (S305). The image switching flag is turned on (S306) only when the operation is based on a mouse having the first or second priority.

When the input does not relate to an image switching operation or when the operated mouse is not that having the first or second priority, the process of step S306 is skipped.

At step S307, determination is made whether the input relates to the switching operation of the priority. When YES, the priority of the mouse of that operation is identified. More specifically, when the operated mouse has the first priority, the control proceeds to step S309 where a priority interchange process is carried out. The mouse having the first priority now has the second priority, and the mouse having the second priority now has the first priority. Then, the control proceeds to step S311 where a priority switching flag is turned on.

When determination is made that the operating mouse has the second priority at step S308, the control proceeds to step S310 where a different priority interchange process is carried out. More specifically, the mouse with the second priority has its priority taken away, and an arbitrary mouse that did not have a priority is assigned the second priority. Then, the control proceeds to step S311.

When determination is made that the operating mouse has neither the first nor second priority at step S308, there is no change in the priority. The present process is terminated without turning on the priority switching flag.

The switching operation of the priority may be carried out according to a menu format instead of the above-described specification via the operation of each mouse.

Figure 7:
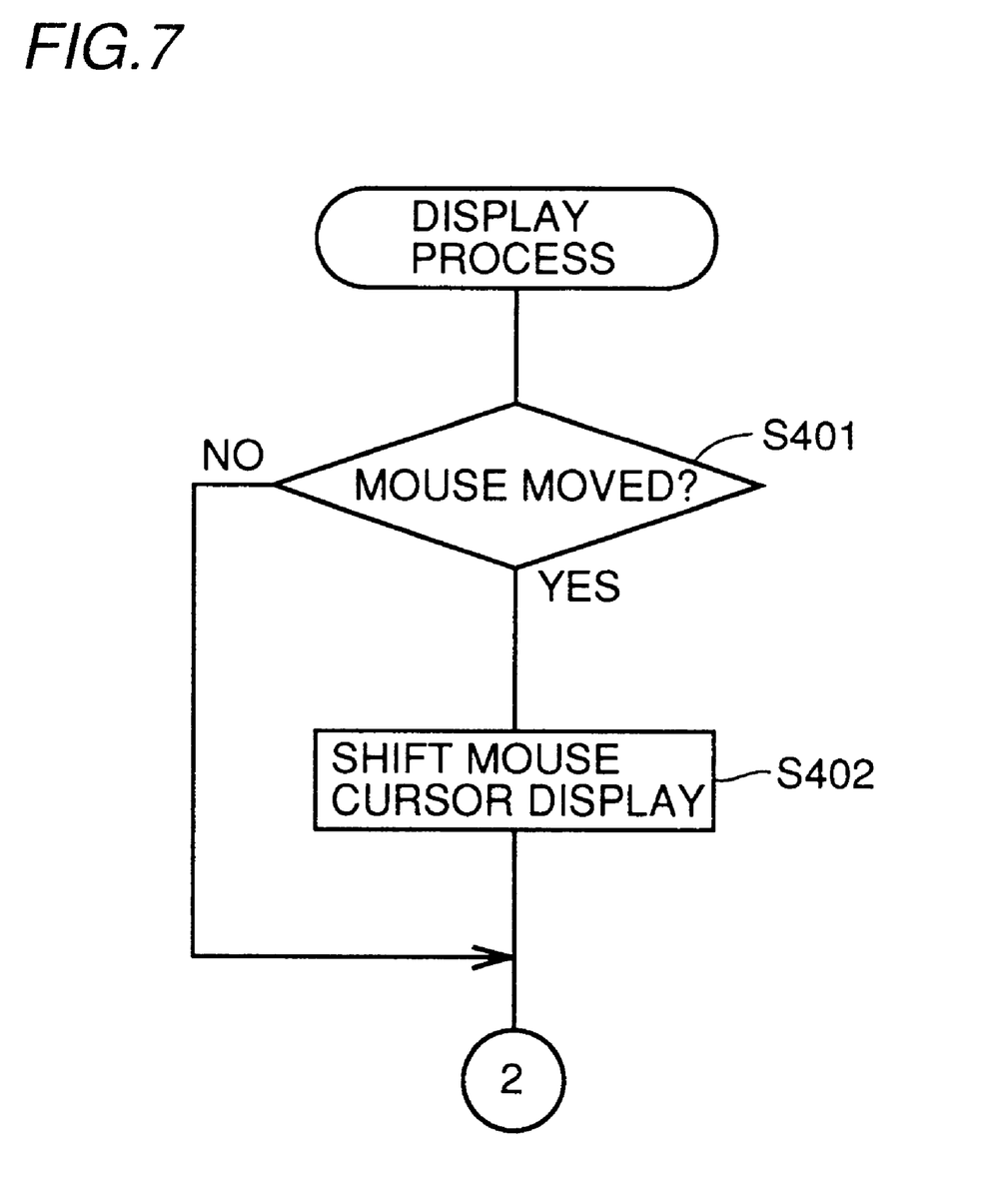
FIGS. 7, 8 and 9 are flow charts partially showing the contents of the display process routine of FIG. 3.
Figure 8:
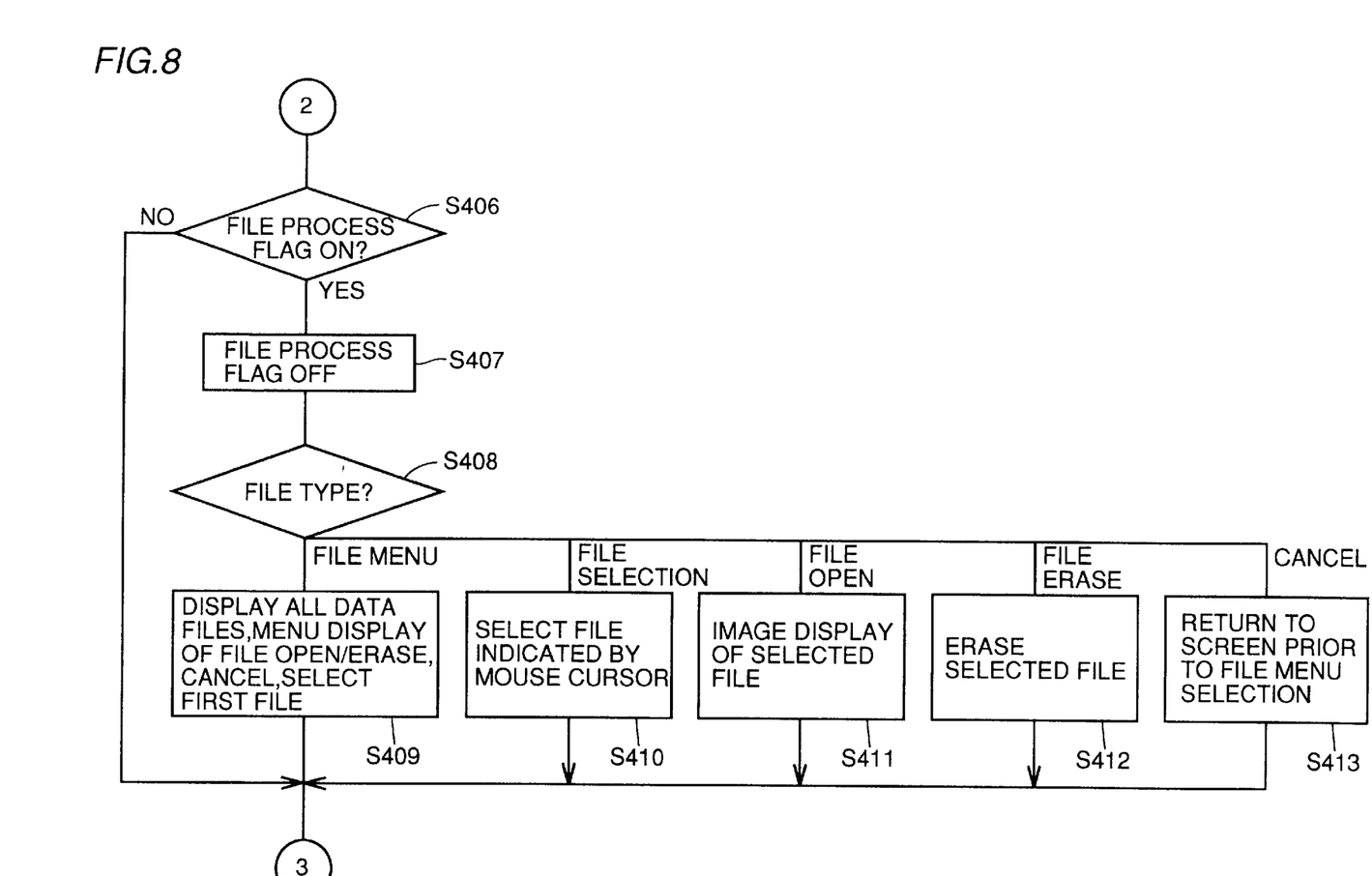
Figure 9:
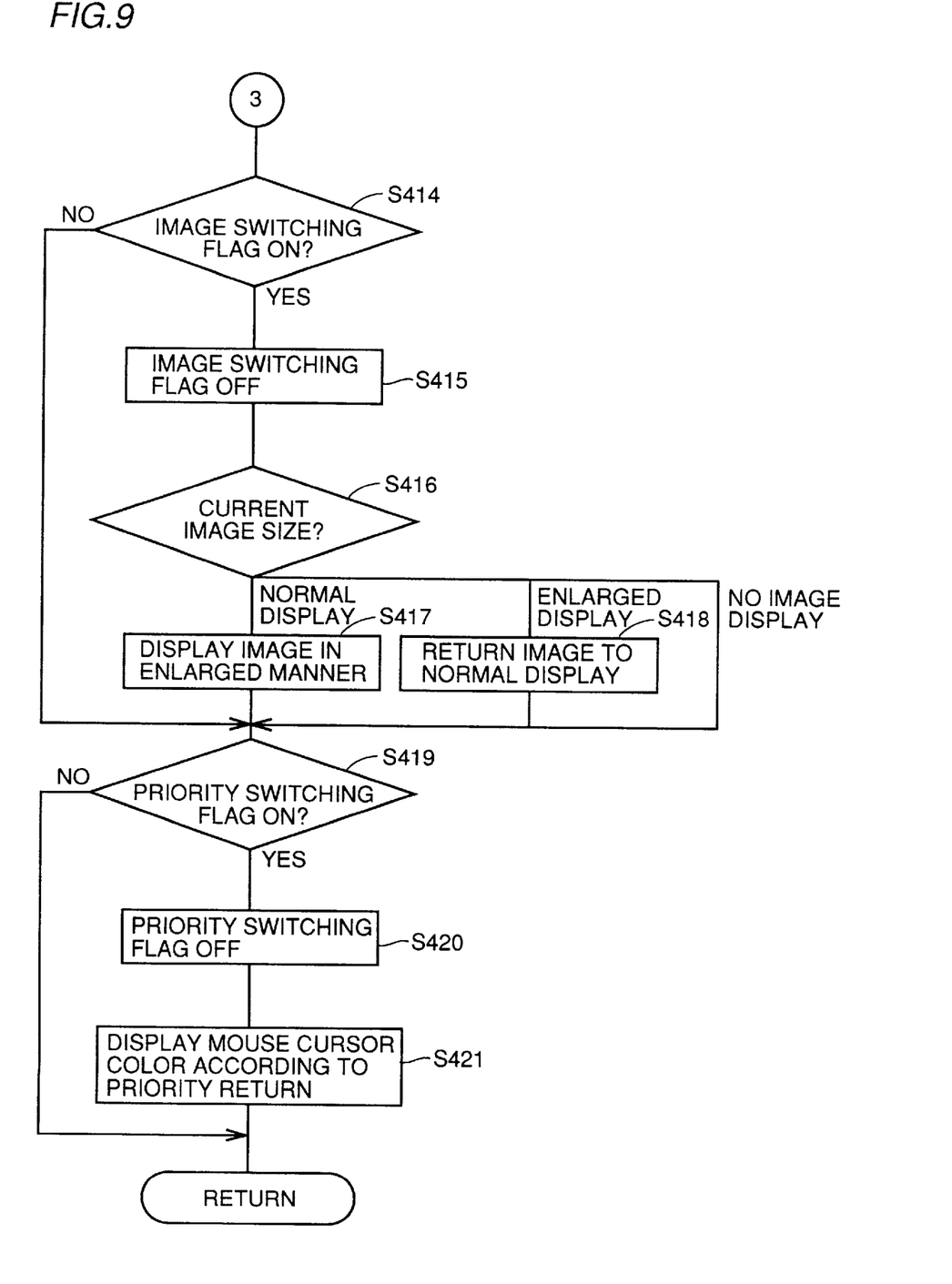

FIGS. 7–9 are flow charts showing the content of the display process routine of FIG. 3.

Upon entering the display process routine, determination is made whether the mouse is moved or not at step S401. When YES, the mouse cursor display corresponding to the moved mouse is shifted (S402). It is to be noted that a mouse cursor is shifted in response to movement of a corresponding mouse irrespective of whether that mouse has a priority or not. This means that each of a plurality of people using respective cursors can indicate a desired location on the screen concurrently.

At step S406, determination is made whether the file process flag is turned on or not. When the file process flag is turned on, the file process flag is turned off at step S407. Then at step S408, the type of the file process is identified. When the type of the process is based upon a file menu, the control proceeds to step S409 where the names of all the files in the data file are displayed together with the sub menu of "file open", "file erase" and "cancel". Here, the first file (the file at the top of the list of the entire data file name) is selected. When determination is made that the type of the process is a file select process at step S400 by the location of the mouse cursor on the file name display, the control proceeds to step S410 where that file newly selected.

When the type of the process is a file open process, the control proceeds to step S411 where the image of the selected file is displayed.

When the type of the process is a file erase process, the control proceeds to step S412 where the selected file is erased.

When the type of the process is a cancel process, the control returns to the screen prior to file menu selection (S413).

Then, at step S414, determination is made whether the image switching flag is turned on or not. When the image switching flag is turned on, the image switching flag is turned off at step S415. At step S416, the current image size display is identified. When the current image size is a general display, the control proceeds to step S417 where the image is displayed in an enlarged manner. When the current image size is an enlarged display, the image is returned to the normal display at step S418. When the current image size is not displayed, the processes of steps S417 and S418 are skipped. When determination is made that the image switching flag is not turned at step S414, the image switching process (S415–S417) are skipped to proceed to the next step.

At step S419, determination is made whether the priority switching flag is turned on. When the priority switching flag is turned on, the control proceeds to step S420 where the priority switching flag is turned off. The corresponding mouse cursor according to the switching of the priority is displayed in a predetermined color (S421), and the display process is terminated.

When the priority switching flag is not turned on, the priority switching process (S420, S421) is skipped. The display process is terminated.

Although the switching operation of the priority of a mouse is carried out in a software manner according to the multi-user edit program, switching may be carried out in a hardware manner by changing the position of the input port of the mouse.

In the above-described embodiment, switching of the priority of a mouse was allowed. As an alternative, addition or cancel of a priority may be carried out independently of each mouse. This provides the advantage that the usage function of a mouse can be accommodated more flexibly according to what is to be edited.

The present invention is not limited to the above-described embodiment in which the priority of a mouse corresponds to three stages of an operative range, and two or more than four stages of the operable range, or no stages can be provided according to the edit application.

Although a mouse is used as an input device in the above embodiment, a device other than a mouse such as the keyboard may be used as long as a similar editing function can be carried out.

In the above-described embodiment, the plurality of mouse cursors are displayed in different colors. The plurality of mouse cursors may be displayed in the same color with different shapes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor system, comprising:
   a plurality of input devices, each of which is given an order of priority;
   a processing unit to which said input devices are connected and which executes predetermined processes in accordance with instructions entered from said input devices, wherein the nature of the processing which can be executed depends on the priority level of the input device which enters the instruction;
   a priority order changer which changes the order of priority given to said input devices;
   a display device; and
   a user interface which is displayed on said display device and which permits said input devices to select one of the predetermined processes at an arbitrary timing, wherein the predetermined processes include a process to change the order of priority given to said input devices by accessing said priority order changer.

2. A processor system as claimed in claim 1, wherein said priority order changer exchanges the priority order of one of said input devices with that of another.

3. The processor system of claim 2, wherein said priority order changer exchanges the priority level of the input device which accesses the priority order changer via said user interface with the priority level of an input device having the next lowest priority level.

4. A processor system as claimed in claim 1, wherein said priority order changer changes the priority order only by the instruction from said input devices having a specified priority order.

5. A processor system as claimed in claim 1, wherein said processing unit displays different pointers corresponding to each of said input devices on said display device.

6. A processor system as claimed in claim 5, wherein said processing unit displays said pointers with different color to define the priority order of corresponding input devices.

7. A processor system as claimed in claim 6, wherein said processing unit changes the color of said pointers in accordance with the change of the priority order of corresponding input devices.

8. A processor system as claimed in claim 1, wherein said input devices are mice.

9. A processor system as claimed in claim 1, wherein said input devices are wireless-connected to said processing unit.

10. A processor system as claimed in claim 9, wherein said input devices are connected to said processing unit via an infrared interface.

* * * * *